(12) United States Patent
Chapman et al.

(10) Patent No.: US 6,233,245 B1
(45) Date of Patent: May 15, 2001

(54) METHOD AND APPARATUS FOR MANAGEMENT OF BANDWIDTH IN A DATA COMMUNICATION NETWORK

(75) Inventors: Alan Stanley John Chapman, Kanata (CA); Hsiang-Tsung Kung, Lexington, MA (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/997,778

(22) Filed: Dec. 24, 1997

(51) Int. Cl.[7] .............................. H04L 12/28; H04L 12/56
(52) U.S. Cl. .......................................... 370/412; 370/429
(58) Field of Search .................................. 370/412, 413, 370/414, 458, 395, 397, 399, 230, 252, 229, 235, 468, 429, 231, 236, 428

(56) References Cited

U.S. PATENT DOCUMENTS

| | | | |
|---|---|---|---|
| 5,097,257 | * 3/1992 | Clough et al. | 345/132 |
| 5,381,413 | * 1/1995 | Tobagi et al. | 370/448 |
| 5,550,823 | * 8/1996 | Irie et al. | 370/413 |
| 5,818,818 | * 10/1998 | Soumiya et al. | 370/252 |
| 5,818,842 | * 10/1998 | Burwell et al. | 370/397 |
| 5,822,317 | * 10/1998 | Shibata | 370/474 |
| 5,870,629 | * 2/1999 | Borden et al. | 710/44 |
| 6,023,456 | * 2/2000 | Chapman et al. | 370/252 |

OTHER PUBLICATIONS

Falchi M: "IP and ATM Integration: QOS Issues QIth Enhanced Buffer Scheduling" ISS '97. World Telecommunications Congress (Int. Switching Symposium) Toronto, Sep. 21–26, 1997, pp 459–464.

Katsube Y et al: "Internetworking Architecture Based on Routers with Cell Switching Capability" ISS '97 World Telecommunications Congress (Int. Switching Symposium) Toronto, Sep. 21–26, 1997, pp 89–95.

Hurwicz M: "Faster, Smarter Nets" Byte, vol. 22 No. 4 Apr. 1997, pp 83–84, 86, 88.

Berardi F et al: "Design and Implementation of an ATM Multiplexer Operating with a Weighted Round Robin Algorithm"; ICCC'97. 13th Int. Conference on Computer Comm. Keys, Cannes Nov. 18–21, 1997, pp 397–405.

\* cited by examiner

*Primary Examiner*—Ajit Patel
*Assistant Examiner*—Brian Nguyen

(57) ABSTRACT

The present invention relates to the field of data communication networks. More specifically, it pertains to devices and methods for the management of bandwidth on links between routing nodes in data networks. The system is particularly useful for reducing congestion caused by high volume traffic streams. The invention provides a novel router that separates traffic on the basis of data type into separate queues buffers. The various queue buffers are associated with virtual output ports on a common physical link. A scheduler regulates the data release from the queue buffers into the physical link to control the bandwidth portion that is made available to each type of data.

16 Claims, 6 Drawing Sheets

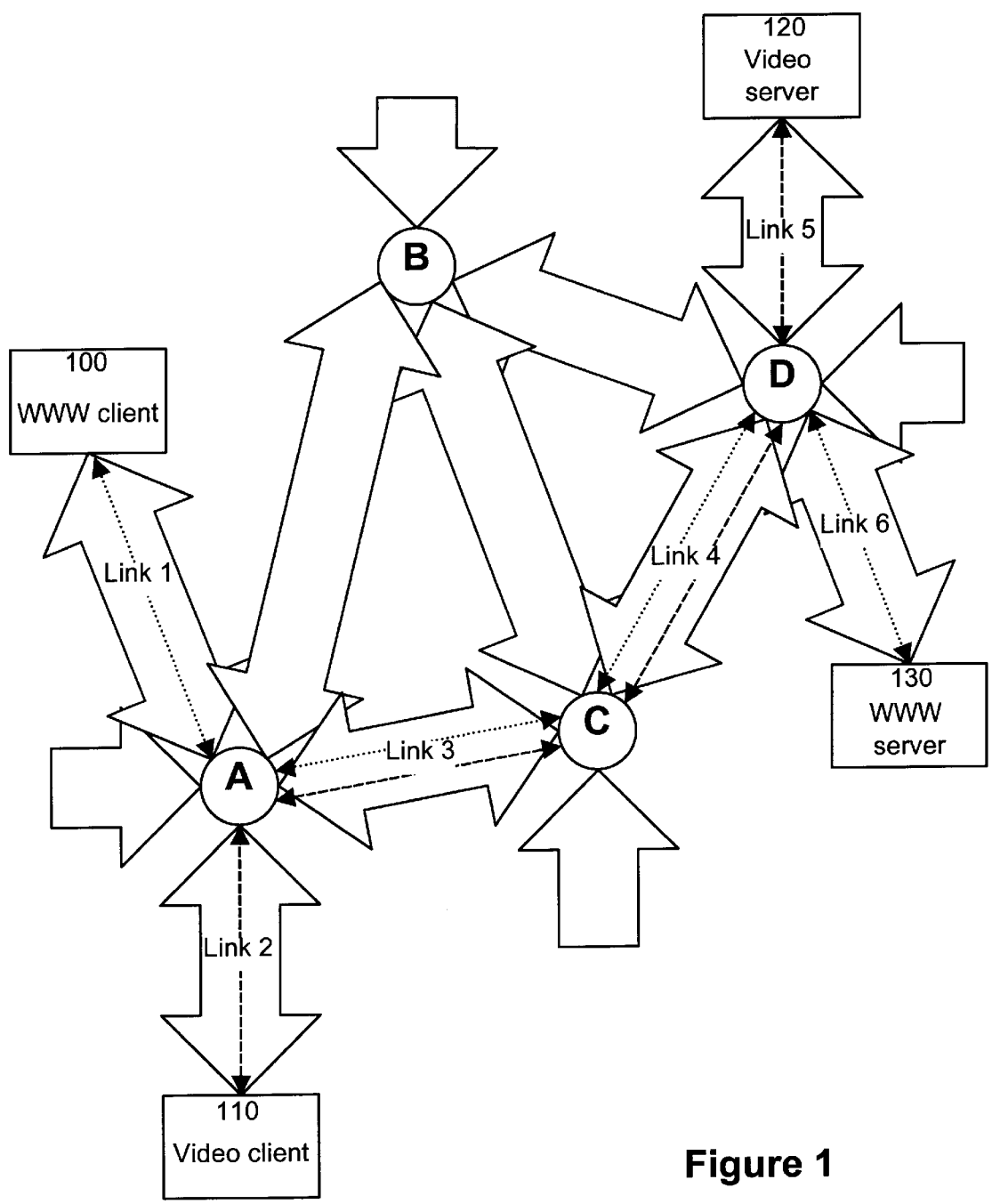
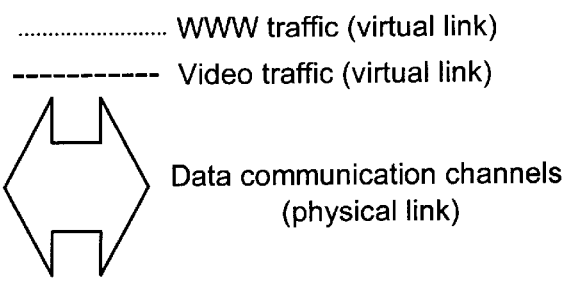
Figure 1

METHOD AND APPARATUS FOR MANAGEMENT OF BANDWIDTH IN A DATA COMMUNICATION NETWORK

FIELD OF THE INVENTION

The present invention relates to the field of data communication networks. More specifically, it pertains to devices and methods for the management of bandwidth on links between routing nodes in data networks. The system is particularly useful for reducing congestion caused by high volume traffic streams.

BACKGROUND OF THE INVENTION

A typical data communications network operates in a connectionless mode whereby there is no negotiation between the transmitter/receiver and the network with regard to the type or quantity of traffic that is to be sent. The transmitter simply sends the traffic on the network, and relies on the network components to deliver that traffic to the receiver accurately. In these networks, the protocols used by the transmitters and receivers are designed to accommodate the delay and loss that can arise from congestion. These same protocols also adapt the traffic flow to some extent to help alleviate congestion.

The networks are typically made up of routing nodes (routers) joined by physical links. The main function of the routing nodes is to direct incoming packets to the appropriate outgoing links. Congestion in the routing nodes is usually caused by an amount of traffic directed to a physical link exceeding its capacity. Queues form in the routing nodes and, when the queue (buffer) overflows, packets are lost. These buffers can smooth out transient surges of traffic, but ultimately, packets are discarded. For the Transmission Control Protocol (TCP from the Internet TCP/IP protocol suite), the loss of packets is a stimulus to reduce the rate of transmission and help share the link bandwidth in a controlled way. Other protocols, such as UDP (Unacknowledged Datagram Protocol), do not adapt in this way, and an application using UDP to transfer information can continue to send traffic regardless of congestion on the links.

High volume traffic streams on the network accelerate congestion and, if they cannot adapt to alleviate that congestion, can seriously impact the performance for all other network users. Streaming video is an example of such high volume traffic. Video is becoming more and more prevalent and it is anticipated that the presence of video sources may cause severe problems for TCP users.

One solution to this problem is to replace the routed (connectionless) network by a connection-oriented network such as an ATM network that allows for traffic segregation and bandwidth allocation. Unfortunately, this solution is undesirable because of capital costs, retraining and the requirement for new network management procedures.

Another solution is provided by the fact that the Internet Engineering Task Force (IETF) is defining new protocols for bandwidth management and newer high-end routers will have the capability of implementing bandwidth management. However, this solution requires new hardware or software and is not yet widely available. Furthermore, many network providers will find that replacing existing equipment is too expensive.

The background information presented herein clearly shows that there exists a need in the industry to provide a method for simple management of bandwidth in a data communication network particularly well suited for reducing congestion caused by high volume traffic streams.

OBJECTIVES AND SUMMARY OF THE INVENTION

An object of this invention is to provide a system capable of implementing a bandwidth control mechanism on a physical link connecting the router to another node of the network.

Another object of the invention is to provide a method for controlling bandwidth in a connection-less network.

As embodied and broadly described herein, the invention provides a system for controlling the transmission of data traffic units into a physical link, each data traffic unit having a recognizable characteristic, said system comprising:
- a first and second queue buffers capable of receiving data traffic units;
- means for dispatching data traffic units from an incoming data stream to a selected one of said queue buffers on a basis of the recognizable characteristic of each traffic unit;
- a scheduler for releasing data into the physical link from each of said first and second queue buffers at a certain rate.

In a preferred embodiment, the invention provides a novel router that implements a bandwidth control functionality on a certain physical link to which the router is connected. The router receives from an input port data traffic units, such as IP data packets to be transmitted to a certain output port, the choice of the output port being made by invoking the routing logic of the router. The routing decision is taken by reading a routing table that determines the best way for a packet to reach its destination. For instance, the address field in an IP data packet indicates the destination of the data packet. The router reads the address information and consults the routing table to determine the output port of the router through which the data packet should be sent so the desired destination is reached. This mode of data transfer is referred to as "connection-less" because there is no defined end-to-end connection in the network established during a certain data exchange transaction.

The router in accordance with the invention features a multiple queue structure associated to the physical link over which the bandwidth control is to be implemented. IP data packets arriving at an input port of the router and directed to the output port connected to the bandwidth controlled physical link are placed in a selected one of the queues. The choice of the queue that is to receive the data packet may be made on the basis of a certain recognisable characteristic of the IP data packet, such as the source address information from which one may derive the type of data that the packet contains. In a very specific embodiment, the router is provided with two separate queues, one queue being dedicated for video/voice data that consumer significant amounts of bandwidth, the other queue being reserved for the rest of the traffic that is transported over the bandwidth controlled physical link. That traffic may be file transfer, text transfer among many other types of data exchange that in general require much less bandwidth than video or voice traffic.

A scheduler mechanism controls the rate at which data is taken from one queue and passed to the physical link for transport to a desired destination. The scheduler mechanism effectively controls the bandwidth allocation for each type of traffic by gating the data from each queue to the physical link.

The separation of traffic in different queues limits the likelihood of high bandwidth data transmission interfering with the transmission of other traffic. In the case of video/voice data, the data packets are placed in the same queue and compete for bandwidth among themselves. The other traffic is protected from congestion by the video/voice data since it is placed in a different queue.

A convenient way to implement the functionality of the above described bandwidth control mechanism is to provide the router with an ATM interface that is designed to provide a multitude of virtual pathways within a single physical link. More specifically, it suffices to associate each queue with a certain virtual port on the ATM interface and transfer data from that queue to this reserved port. The ATM interface provides the scheduler mechanism functionality so the transfer of data on each virtual pathway is gated as desired. When data packets are passed to the ATM interface they are translated into an ATM format that is different from the IP data packet format normally used in the connection-less type data networks. For compatibility, the output end of the physical link should also terminate on an ATM interface to enable suitable re-translation to an IP data packet format.

Distinguishing the nature of the data in the data packets arriving at the input port of the router in order to determine in which queue the packet will be transferred may be difficult to achieve in practice. One theoretical possibility is to examine the payload or user data segment of the TP data packet in an attempt to determine the kind of data that is being transported. A simpler approach is to rely on the source address placed in the TP data packet, with prior knowledge of the kind of data this source is likely to be sending. For instance, some well identified sources may be sending mostly video or voice data. Any data packet issued from any one of those sources may then be assumed to contain video data and it will be transferred to the associated queue. Yet another possibility is to rely on the identity of the input port of the router at which the data packet has arrived. This is particularly suitable when the router has an input port connected to a single source that generates most of the time a certain data type, thus there is a strong likelihood that a data packet arriving at the designated port will be of the particular data type.

As embodied and broadly described herein, the invention provides a method for controlling the transmission of data traffic units into a physical link, each data traffic unit having a recognizable characteristic, said method comprising the steps of:

providing first and second queue buffers capable of receiving data traffic units;

dispatching data traffic units from an incoming data stream to a selected one of said queue buffers on a basis of the recognizable characteristic of each traffic unit;

releasing data into the physical link from each of said first and second queue buffers at a certain rate.

As embodied and broadly described herein the invention provides a router comprising:

a plurality of ports capable of supporting respective physical links, each port being capable of exchanging data traffic units with a respective physical link, each data traffic unit having a recognizable characteristic;

a first and second queue buffers capable of receiving data traffic units, said queue buffers being associated with a certain physical link:

means for dispatching data traffic units received through either one port and a plurality of ports by said router to a selected one of said queue buffers on a basis of the recognizable characteristic of each traffic unit;

a scheduler for releasing data toward the certain physical link from each of said first and second queue buffers at certain rate.

BRIEF DESCRIPTION OF THE DRAWINGS

FIG. 1 is a block diagram of a data communication network;

DESCRIPTION OF A PREFERRED EMBODIMENT

Figure 2:
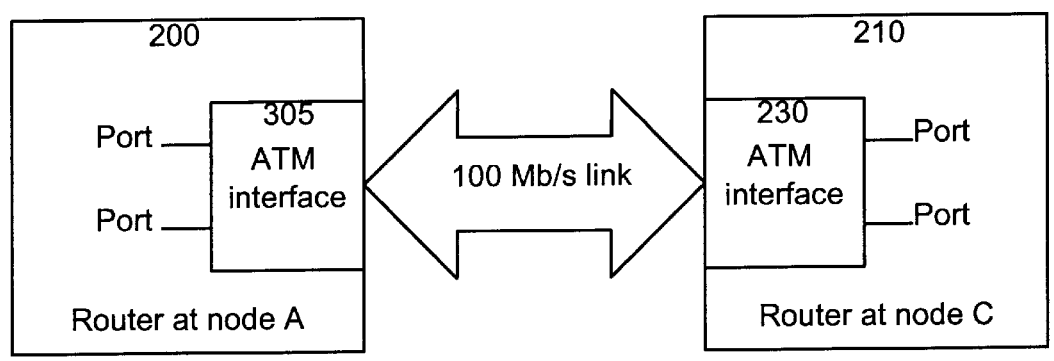
FIG. 2 is a block diagram of a single link in a data communications network using routers in accordance with an embodiment of this invention.

FIG. 1 illustrates an example of a situation where two types of traffic travel on physical links 3 and 4. In this diagram, a World Wide Web (WWW) client 100 requests access to a WWW server 130 to receive data, say a file, by using the HTTP protocol, and a video client 110 requests access to a video server 120 to receive video data. In this case, both types of traffic travel on link 3 and link 4 through nodes A, C, and D. Each one of these nodes would usually include a router such as illustrated in FIG. 2. For reasons discussed earlier, it is necessary, in this example, to protect the WWW traffic from the video traffic. In a specific embodiment, the video traffic (i.e. the high volume traffic) could be limited to 50 percent of the capacity of the physical link 3.

FIG. 2 shows a single link, such as link 3 from FIG. 1, including the routers at the ends of the link that are provided with Asynchronous Transfer Mode (ATM) interfaces designed to create virtual ports. More specifically, the diagram illustrates a router 200 at node A with an ATM interface 220 connected to it, which has, in this embodiment, two virtual input ports. At node C, router 210 has an ATM interface 230 as well with the same virtual ports.

Figure 3:
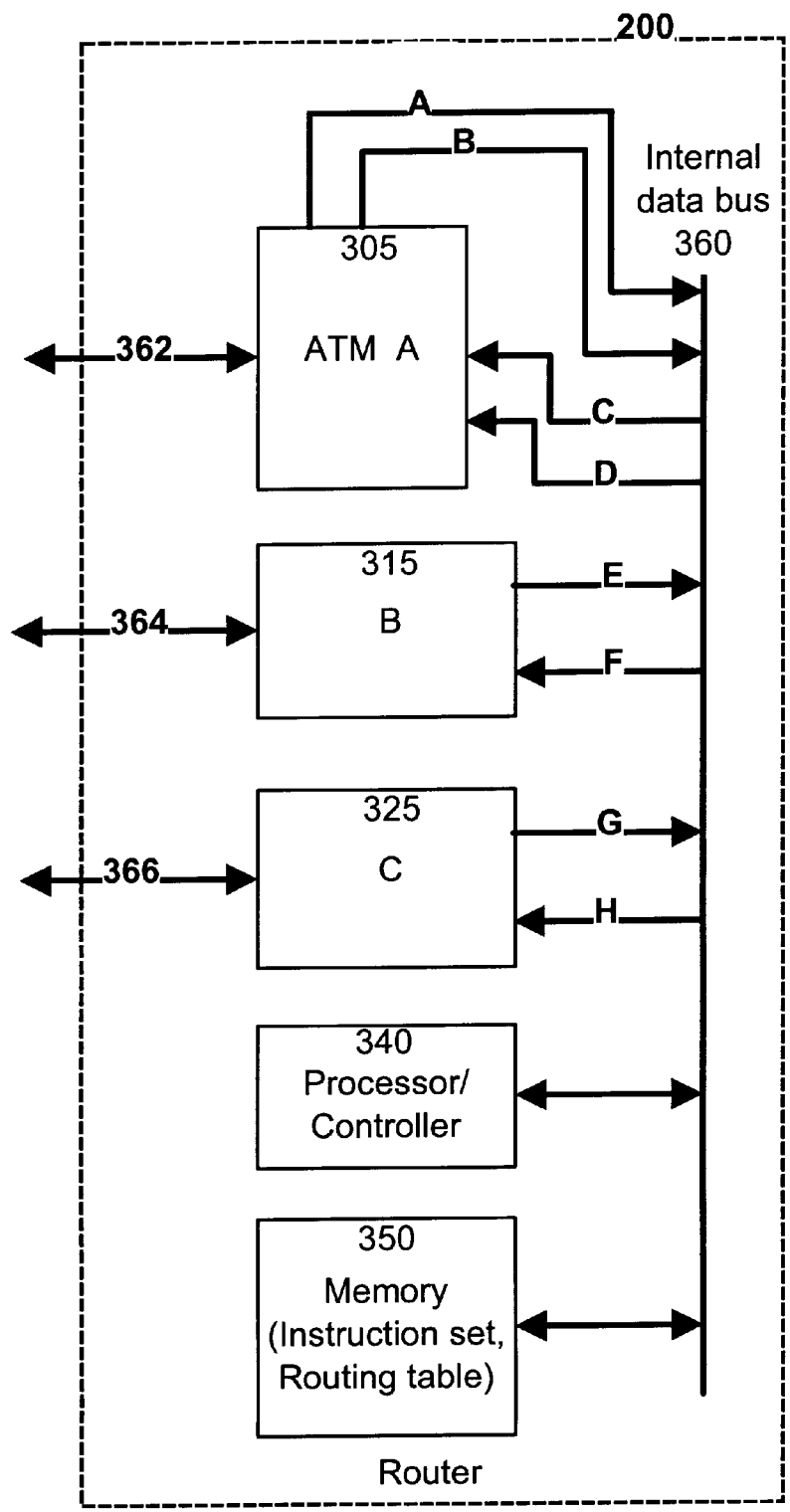
FIG. 3 is a block diagram illustrating the main components of the router in accordance with the invention.

The structure of the router 200 is shown in FIG. 3 (the router 210 is identical to the router 200). The router 200 is comprised of interfaces 305, 315, 325, a processor/controller 340 and a memory 350. A bus 360 interconnects these components to enable data to be exchanged between them. The router 200 shown at FIG. 3 has 8 ports, identified as port A, port 8 port C, port D, port E, port F, port G and port H. These ports connect the router to physical links 362, 364 and 366 permitting to carry data to other nodes of the network. For the sake of the discussion assume that ports G and E are input ports on the physical links 364 and 366, respectively, while ports F and H are the output ports on those physical links. The input ports are designed to receive data from the respective physical link while an output port is designed to transmit data over the associated physical link. Ports A, B, C and D are special. They constitute virtual ports over the same physical link 362. More specifically, ports A and B are two virtual input ports over the physical link 362 while ports C and D are two virtual output ports over physical link 362. The processor/controller 340 is a CPU that executes instructions stored in the memory 350 so as to perform the data routing task. The memory also stores data on which the processor/controller 340 operates namely the data packets received from any one of the input ports.

The interfaces 305, 315 and 325 interconnect the various input and output ports to the physical links 362, 364 and 366, respectively. The interfaces 315 and 325 are of standard design. Their function is to transmit incoming IP data packets to the internal data bus 360 so those data packets can be stored in the memory 350 while the processor/controller determines how the IP data packets are to be handled. On the output side, the interfaces are also designed to accept IP data packets from the memory 350 through the data bus 360 and impress the necessary electrical signals over the respective physical links so that the signal transmission can take effect. It is not deemed necessary to discuss the structure and operation of the interfaces 315 and 325 in more detail because they are well known to those skilled in the art and these components in themselves are not critical to the success of the invention.

The interface 305 is different. This interface implements the ATM transmission protocol. This protocol enables the creation of several virtual ports (ports A and B for input and C and D for output) over a single physical link. This functionality of the ATM interface simplifies greatly the implementation of the invention.

Figure 4:
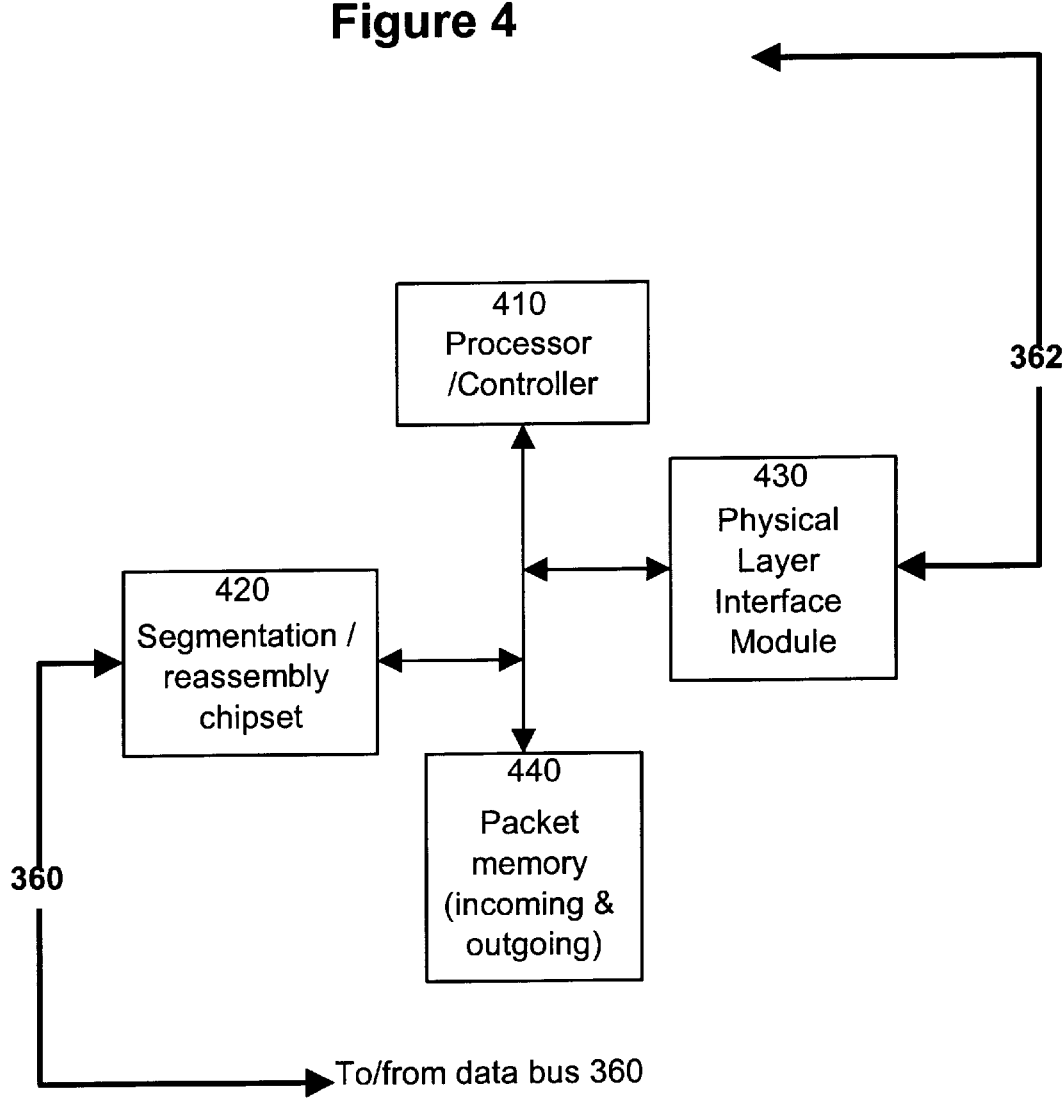
FIG. 4 is a block diagram illustrating the main components of an ATM Network interface.

FIG. 4 is a detailed block diagram illustrating the main components of the ATM interface 305 configured according to an embodiment of this invention. The ATM interface 305 includes a processor/controller 410, a Segmentation/Reassembly Chipset (SAC) 420, a Physical Layer interface Module (PLIM) 430 and a packet memory 440 including incoming and outgoing queues in the form of buffers (not shown in the drawings). On one side the ATM interface 305 is connected to the router data bus 360, and on the other side it is connected to the physical link 362 which could have 155 Mb/s bandwidth capacity. As illustrated at FIG. 2 the physical link 362 terminates on a similar ATM interface at the other end.

Since ATM has a specific format for cells (53 bytes) it requires that packets received from higher level protocols be segmented (in the transmit direction) and reassembled (in the receive direction). This task is accomplished by the segmentation and reassembly (SAR) chipset 420. In a specific example, an IP data packet transferred to the ATM interface 305 will be processed by the SAR chipset 420 that will translate the IP data packet into a series of 53 byte cells that can then be transmitted over the physical link 362. The companion ATM interface 230 at the other end of the physical link 362 will then re-assemble the group of cells into an IP data packet that will be passed to the router 210 for further processing.

The PLIM 430 is a component of the ATM interface 305. It interfaces directly with the physical layer (physical link 362) and is chosen according to the user's desired communication network standard (i.e. SONET/SDH, DS3, etc.).

The packet memory 440 is used to store packets during the SAR process. The processor/controller 410 is a CPU that regulates the function of the ATM interface 305. The processor/controller 410 executes code stored in the memory 440 to implement a scheduler mechanism, to be described in detail later.

Figure 5:
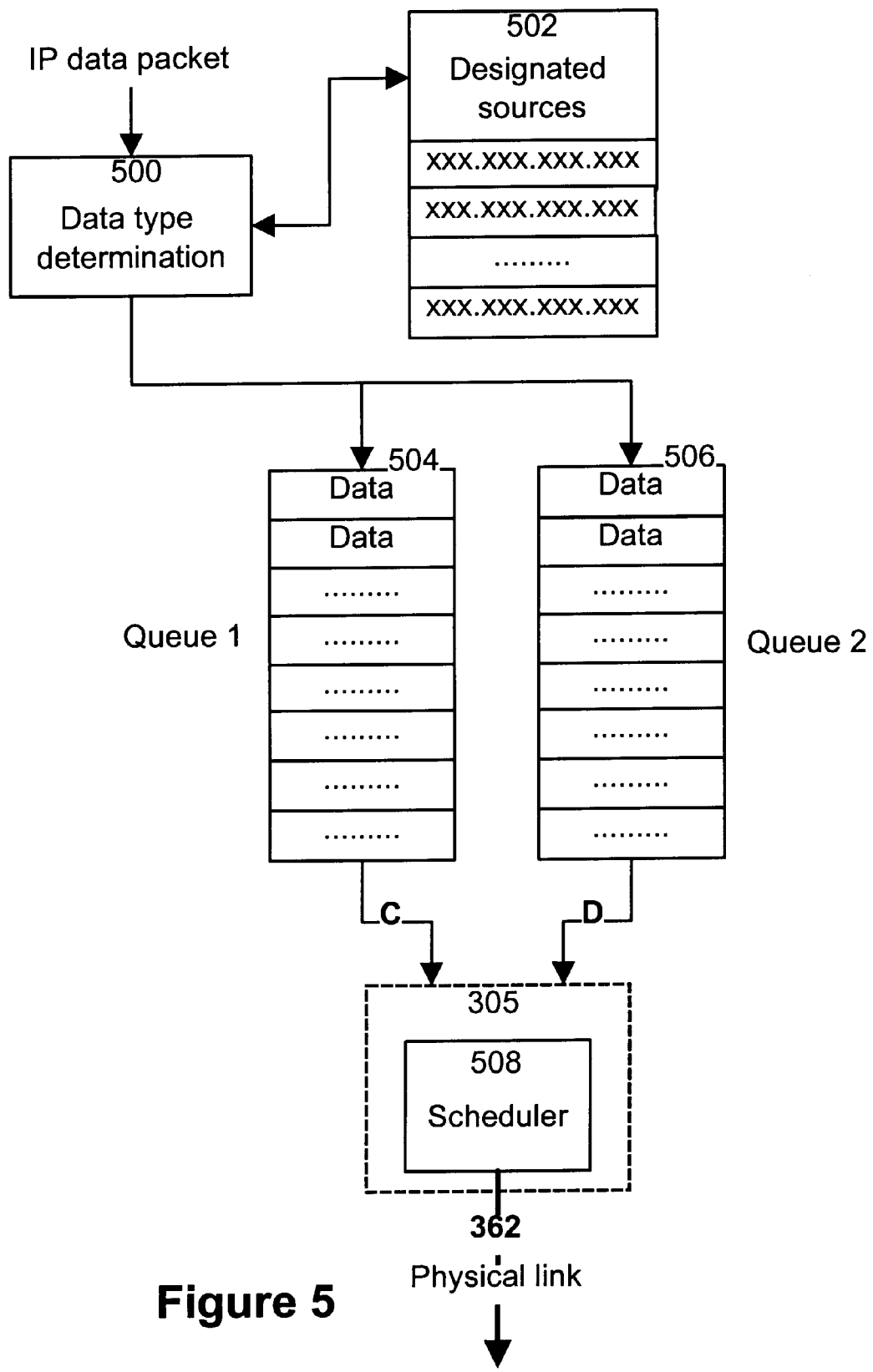
FIG. 5 is a high level block diagram of the bandwidth control mechanism implemented in the router in accordance with the invention.

A block diagram of the bandwidth control mechanism implemented by the router 200 is illustrated in FIG. 5 of the annexed drawings. The bandwidth control mechanism includes a data type determination functional bloc 500 designed to determine the type of data carried by an IP data packet received by the router. In a specific embodiment, the data type determination functional block 500 is software implemented in the router 200 and comprises a data structure such as a database 502 that stores source addresses of network clients (sources of data) known to deliver mostly data having high bandwidth requirements such as video or voice data, This data structure is pre-programmed in the system on the basis of prior knowledge. Typically, the system administrator determines the sources in the network that are likely to generate high bandwidth requirement data transfers and entries corresponding to the addresses of those sources are created in the data structure. The data determination type functional block 500 also includes a search capability that examines the source address contained in a IP data packet received and compares that source address against those stored in the database 502. If a match is found the data type determination block 500 then concludes that the IP data packet has a high bandwidth requirement and passes that packet to a reserved queue 504. On the other hand, if no match is found, the data type determination functional block 500 concludes that the IP data packet is not of the high bandwidth requirement type and passes the IP data packet to queue 506. Queues 504 and 506 are implemented by the memory 350. A certain portion of the memory is reserved to create each queue. What is required is a simple data structure of the FIFO type where a stack of IP data packets can be temporarily stored.

The above operation amounts to filtering the incoming data packets and then storing the packets in separate queues in dependence upon the bandwidth requirements of each packet. Each queue is associated with a given output virtual port of the ATM interface 305. More specifically, the queue 504 holding high bandwidth requirement data is associated to the virtual output port C while the queue 506 holding the low bandwidth requirement data is associated with virtual output port D. In practice this association can be established on the basis of the port designation. For instance, each one of the virtual output ports C and D can be designated by a unique address. Data from a given queue is delivered to the associated virtual output port by directing the data to the address of that virtual port.

Once an IP data packet issued from any one of the queues 504 and 506 is received at the respective virtual port on the ATM interface 305, the IP data packet is placed in an input buffer that is part of the memory 440. The SAR chipset 420 then performs the translation of the IP data packet into a series of cells in accordance with the ATM transmission format. The cells resulting from data presented at a given virtual port will all carry the port identifier so that they can be properly reassembled at the receiving end. This operation creates in the memory 440 two sets of cells, one set resulting from data presented at one of the virtual ports, the other set resulting from data presented at the other virtual port. As mentioned before, the cell sets can be distinguished from one another on the basis of the virtual port identifier. Most preferably, each set of cells is stored in a separate buffer that is part of the memory 440. A scheduler mechanism 508 regulates how the cells from the two separate buffers will be transported through the physical link 362. The scheduler 508 is software implemented in the ATM interface 305 and it is designed to multiplex the cells from separate virtual ports according to a predefined rate that determines the bandwidth apportioning for each type of data. In a specific embodiment, the high bandwidth requirement data stored in the queue 504 is allocated 50% of the bandwidth. This provides a 50% balance for the other traffic. Under this bandwidth allocation scheme, the scheduler 508 will take a cell from one buffer (associated with one virtual port) and transfer that cell on the physical link. Next, the scheduler 508 takes a cell from the other buffer and places that cell on the physical link. As the loading in the buffers drops below a certain point, more data is being fetched from the queues 504 and 506. In the case described above, an assumption was made to the effect that the buffers in the memory 440 are depleted at the same time.

Different bandwidth allocation schemes are possible. For instance, a 75%/25% scheme will require to program the scheduler 508 such that for every cell taken from a certain buffer (corresponding to the 25% bandwidth fraction) 3 cells are transmitted from the other buffer (corresponding to the 75% bandwidth fraction).

In the above example, the selection of the queue into which an incoming IP data packet will be transferred is made on the basis of the address of the source that has issued the packet. Another possibility is to rely on the identity of the input port through which the IP data packet has been transferred to the router 200. This arrangement is suitable for network configurations where the router is connected through a physical link to a single source that is known to deliver high bandwidth requirement data. In a specific example, a video data client is directly connected to an input port of the router 200. No other connections are made to that input port except for the video data client. In those circumstances, it is not necessary to read the source address in each IP data packet and it suffices to determine the address of the port through which the IP data packet has been delivered to the router 200 in order to select the appropriate queue.

When the data in the form of ATM cells transported through the physical link 362 arrives at the router 210, a translation from the ATM format to the IP format is made by the local ATM interface. It is not necessary to describe in detail the translation procedure since it is well known to those skilled in the art. Suffice it to say that upon their arrival, the cells are separated from one another based on the virtual port designator. The data contained in those cells is then appended to one another to assemble the original IP data packets. Since an ATM transmission normally maintains the cell order, the ATM interface at the receiving end does not need to reorder the cells, it merely needs to effect the virtual paths separation and then append the data to complete the translation procedure.

Figure 6:
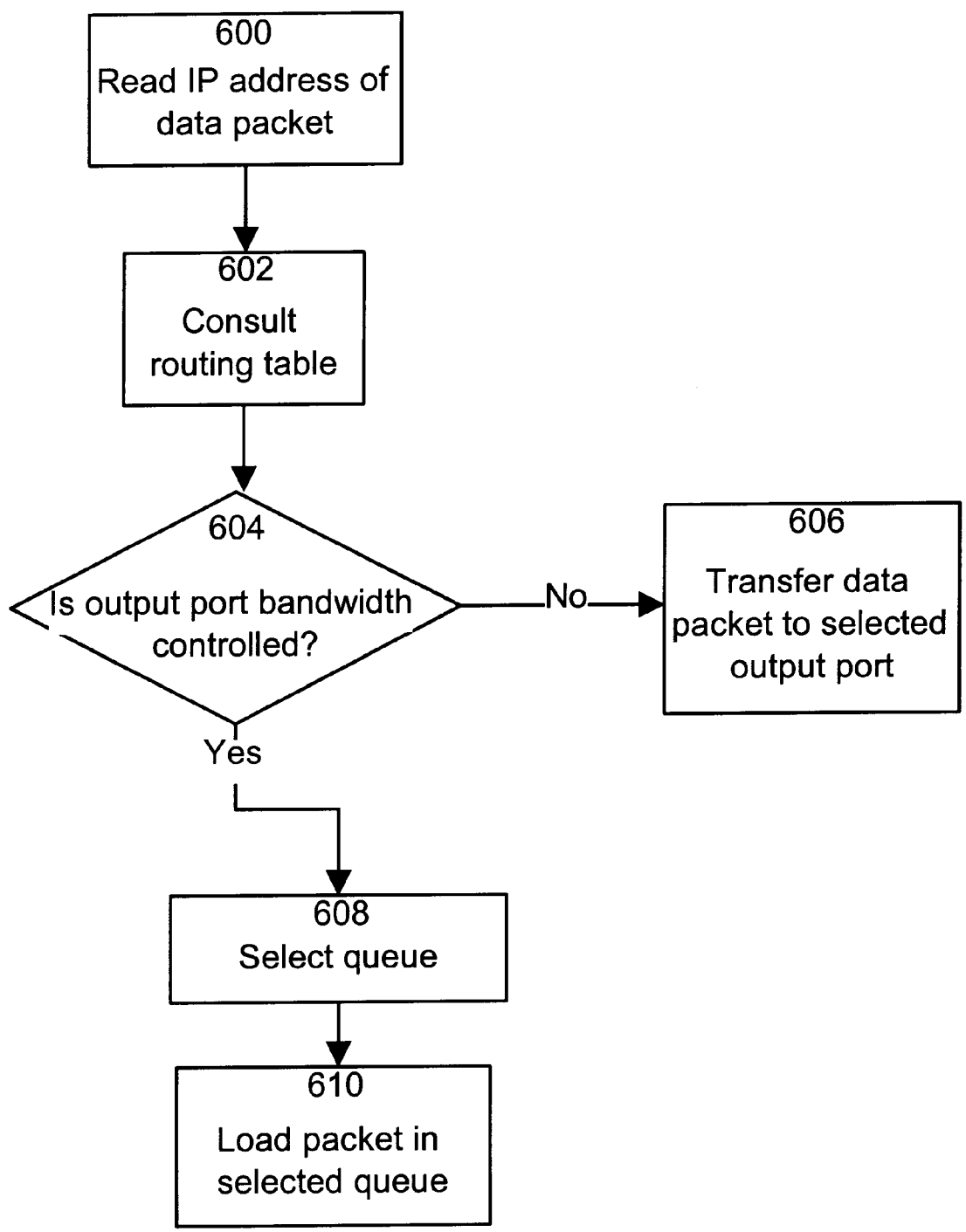
FIG. 6 is a flowchart illustrating the process for determining the routing of an IP data packet in the router in accordance with the invention, prior to invoking the bandwidth control mechanism.

The above described bandwidth control mechanism is implemented only on the physical link 362. Thus, before invoking this mechanism the router 200 must first determine whether the IP data packet will be dispatched to the physical link that is bandwidth controlled. This procedure is described below in conjunction with FIG. 6. At step 600, the IP data packet arrives at the router 200 through any one of its input ports. The destination address of the IP data packet is read and a routing table (not shown in the drawings) that is normally stored in the memory 350 of the router 200 is consulted. As it is well known to those skilled in the art, the routing table determines the output port through which the IP data packet will be transported. If the selection corresponds to any one of the virtual output ports C or D, as determined at step 604, the bandwidth control mechanism is invoked as illustrated at step 608, and the IP data packet is loaded in the appropriate queue as per step 610. On the other hand, if the IP data packet is sent over a physical link that implements no bandwidth control mechanism, the packet is transferred to the associated output port directly, as illustrated at step 606.

The above description of a preferred embodiment under the present invention should not be read in a limitative manner as refinements and variations are possible without departing from the spirit of the invention. The scope of the invention is defined in the appended claims and their equivalents.

We claim:

1. A router for use in a communications network, said router suitable for connection to a plurality of physical links, including at least one shared physical link, for transmitting and receiving data traffic units including source address information, said router comprising:
   first and second input ports for receiving the data traffic units from respective physical links;
   an output port for connection to the shared physical link;
   a memory for implementing first and second queue buffers for storing the data traffic units, said first and second queue buffers being associated with the shared physical link;
   a data type determination unit coupled to said first and second input ports, said data type determination unit operative to dispatch the data traffic units received at said first and second input ports to a selected one of said first and second queue buffers on a basis of the source address information of the data traffic units;
   a scheduler for releasing the data traffic units to said output port from each one of said first and second queue buffers at a certain rate, for transmission over the shared physical link.

2. A router as defined in claim 1, wherein said certain rate is selected in accordance with a portion of the total bandwidth of the shared physical link allocated to each one of said first and second queue buffers.

3. A router as defined in claim 2, wherein each data traffic unit is an IP data packet having a source address.

4. A router as defined in claim 3, wherein said data type determination unit is operative to process the source address of each IP data packet to determine the queue buffer to which the IP data packet is to be dispatched.

5. A router as defined in claim 4, wherein said data type determination unit includes a data structure holding source addresses, said data type determination unit operative to search said data structure to identify the queue buffer associated with the source address of an IP data packet.

6. A system for controlling the transmission of data traffic units over a shared physical link, each data traffic unit including source address information, said system comprising:
   first and second queue buffers capable of storing the data traffic units;
   a data type determination unit operative to receive the data traffic units from a physical link and to dispatch the data traffic units to a selected one of said first and second queue buffers on a basis of the source address information of the data traffic units;
   a scheduler for releasing the data traffic units into the shared physical link from each one of said first and second queue buffers at a certain rate.

7. A system as defined in claim 6, wherein said certain rate is selected in accordance with a portion of the total bandwidth of the shared physical link allocated to each one of said first and second queue buffers.

8. A system as defined in claim 7, wherein each data traffic unit is an IP data packet having a source address.

9. A system as defined in claim 8, wherein said data type determination unit is operative to process the source address of each IP data packet to determine the queue buffer to which the IP data packet is to be dispatched.

10. A system as defined in claim 9, wherein said data type determination unit includes a data structure storing source addresses, said data type determination unit operative to search said data structure to identify the queue buffer associated with the source address of an IP data packet.

11. A method for controlling the transmission of data traffic units over a shared physical link, each data traffic unit including source address information, said method comprising:

provide first and second queue buffers capable of storing the data traffic units;

receiving the data traffic units from a physical link;

dispatching the data traffic units to a selected one of said first and second queue buffers on a basis of the source address information of the data traffic units;

releasing the data traffic units into the shared physical link from each one of said first and second queue buffers at a certain rate.

12. A method as defined in claim 11, wherein said certain rate is selected in accordance with a portion of the total bandwidth of the shared physical link allocated to each one of said first and second queue buffers.

13. A method as defined in claim 12, wherein each data traffic unit is an IP data packet having a source address.

14. A method as defined in claim 13, comprising the step of processing the source address of each IP data packet to determine the queue buffer to which the IP data packet is to be dispatched.

15. A method as defined in claim 14, comprising the step of searching a data structure storing source addresses to identify the queue buffer associated with the source address of an IP data packet.

16. A router for use in a communications network, said router suitable for connection to a plurality of physical links, including at least one shared physical link, for transmitting and receiving data traffic units including source address information, said router comprising:

first and second inputs for receiving the data traffic units from respective physical links;

an output for connection to the shared physical link;

storage means implementing first and second queue buffers for storing the data traffic units, said first and second queue buffers being associated with the shared physical link;

data type determination means coupled to said first and second inputs, said data type determination means operative to dispatch the data traffic units received at said first and second inputs to a selected one of said first and second queue buffers on a basis of the source address information of the data traffic units;

scheduler means for releasing the data traffic units to said output from each one of said first and second queue buffers at a certain rate, for transmission over the shared physical link.

* * * * *